2,871,129
METHOD OF PRODUCING A DIETETIC HONEY STILL CONTAINING ITS ACTIVE PRINCIPLES

Marino Golinelli, Bologna, Italy
No Drawing. Application March 2, 1956
Serial No. 574,053
5 Claims. (Cl. 99—146)

The present invention relates to a method of producing a dietetic food based on honey still containing its active principles and related products.

It is one object of the present invention to obtain a dietetic product based on honey in which are still kept unaltered the active principles which are present in the honey (enzymes and vitamins) and also the sugars and all the other substances which make the honey so useful in the food field. This object is obtained by not submitting the product at the start to a heating which would cause the destruction of the above mentioned active principles.

It is another object of the present invention to provide a novel method which includes the dilution in distilled water and in a sterile atmosphere of the honey, the deproteinization of the solution by means of ultracentrifugation, the filtration and the depigmentation of the centrifugated substance and the concentration of the same.

The present method is described here below with more details.

In a first phase the raw honey is diluted with an equal weight of warm distilled water, maintaining well stirred the mixture until the perfect dissolution of the solute in the solvent is achieved; the stirring must be continued for about 2 hours in order to obtain a perfect homogenization of the product.

This operation is done in a sterile atmosphere under the action of an ultraviolet light and out of contact with atmospherical oxygen, in an atmosphere of inert gas, for example nitrogen. The sterility of the place can be obtained by means of the application of a germicidal lamp of 30 w. every 10 cubic metres of cubature of the room.

A second phase of the method consists of the deproteinization of the solution which has previously been obtained; the greater weight of the proteins, contained in the honey, that is in its solution, permits its separation by means of a treatment of ultracentrifugation. This ultracentrifugation, as it is known, consists of submitting the solution to a centrifugation with a high number of revolutions, for example 50,000 R. P. M.; the product to be separated is thus submitted to a centrifugal force equivalent to about 60,000 times the force of its gravity. The permanence of the solution in the field, submitted to the action of the centrifugal force, must be of at least 25 seconds; therefore the flow will be strictly proportional to the capacity of the rotor. This second phase of the method is continuous, thus permitting to obtain very good results of production compared with a discontinuous method. The operations of this second phase are completed by the filtration by means of a filter-press of the centrifugated substance. This filter comprises, as filtering layers, cardboards or layers of inert substance, with a porosity of between 30 and 50 microns.

The third following phase of the method includes the depigmentation of the product arriving from the filter-press. This operation is made by filtering the product through filters, the filtering mass of which is made by alternate layers of asbestos and kieselguhr (tripoli, fossil meal or diatomaceous earth). The filtering layer will be proportional to the quantity to be filtered, calculating about 1 square metre of filtering surface every 10 litres of solution.

The filtered and depigmentated product is then concentrated, in order to make it stable, and this operation constitutes the fourth phase of the method. The concentration is brought about by freezing. The product is frozen in a proper tank, and the blocks of the solidified material are then submitted to a further cooling until they reach a temperature of the order of —40° C. and to a following evaporation in high vacuum, always maintaining a temperature inferior to —20° C. and a degree of vacuum not inferior to 0.010 mm. of Hg residual.

The product obtained by the concentration has the form of a glassy mass with a content of water of no more than to 5%. This product can be incorporated in fruit jelly, custard and similar products, or it can be used as a sweetening means. In these conditions the product is stable if it is kept in sealed containers, in an atmosphere of nitrogen and in a dark glass to protect it from the light.

It is important to note that the described method permits of the maintenance of the active principles (enzymes, vitamins, etc.) which are present in the natural honey, as well as the other substances that make the honey useful in the dietetic field; the honey and the substances contained therein are not in any way submitted to heating which destroys the presence and the efficiency of the enzymes, of the vitamins, etc. The sterilization, as it has been stated above, is obtained by means of ultraviolet light.

While I have disclosed one embodiment of the present invention, it is to be understood that this embodiment is given by example only and not in a limiting sense, the scope of the present invention being determined by the objects and the claims.

I claim:

1. A method of producing a dietetic food based on honey still containing its active ingredients comprising the steps of diluting the honey in distilled water and in a sterile atmosphere, subjecting the solution to deproteinization by means of ultracentrifugation, to filtration and subjecting to depigmentation the centrifugated substance and concentrating the same by freezing of said depigmented substance to about —40° C. and then subjecting said substance to evaporation in vacuum at a temperature not higher than —20° C. and at a vacuum degree not inferior to 0.010 mm. of Hg residual.

2. The method, as set forth in claim 1, wherein said honey is diluted with an equal weight of warm distilled water when stirred in a sterile atmosphere.

3. The method, as set forth in claim 1, wherein the sterility of the atmosphere of the working room is obtained by means of the action of ultraviolet rays under an inert gas.

4. The method, as set forth in claim 1, wherein the said deproteinization is obtained by means of ultracentrifugation at about 50,000 R. P. M. continuously, then filtering the product.

5. The method, as set forth in claim 1, wherein the said depigmentation is achieved by means of treatment of the ultracentrifugated substance and filtered with filtering masses constituted by alternate layers of asbestos and kieselguhr.

References Cited in the file of this patent

UNITED STATES PATENTS

| | | |
|---|---|---|
| 2,070,171 | Lothrop et al. | Feb. 9, 1937 |
| 2,414,290 | Erickson et al. | Jan. 14, 1947 |
| 2,503,695 | Webb et al. | Apr. 11, 1950 |

OTHER REFERENCES

"New Food Products From Honey," by White, Jr., reprinted from American Bee Journal, vol. 92, No. 12, pp. 504–506.